United States Patent [19]

Carroll

[11] Patent Number: 5,100,552

[45] Date of Patent: * Mar. 31, 1992

[54] CYCLONE SEPARATOR WITH ENLARGED UNDERFLOW SECTION

[75] Inventor: Noel Carroll, Victoria, Australia

[73] Assignee: Conoco Specialty Products Inc., Houston, Tex.

[ * ] Notice: The portion of the term of this patent subsequent to Dec. 25, 2007 has been disclaimed.

[21] Appl. No.: 570,179

[22] Filed: Aug. 20, 1990

Related U.S. Application Data

[63] Continuation of Ser. No. 283,959, Nov. 21, 1988, Pat. No. 4,980,064.

[30] Foreign Application Priority Data

Apr. 23, 1986 [AU] Australia ............................ PH5594

[51] Int. Cl.⁵ ........................................ B01D 17/038
[52] U.S. Cl. ................... 210/512.1; 55/459.1; 209/211; 210/788
[58] Field of Search ............... 209/144, 211; 55/459.1, 55/459.5; 210/512.1, 512.2, 512.3, 788, 787, 136

[56] References Cited

U.S. PATENT DOCUMENTS

| | | | |
|---|---|---|---|
| 3,499,531 | 3/1970 | Feasel | 210/512.1 |
| 3,510,890 | 5/1970 | Estabrook | 210/788 |
| 4,146,468 | 3/1979 | Wilson | 210/512.1 |
| 4,237,006 | 12/1980 | Colman et al. | 210/512.1 |
| 4,375,411 | 3/1983 | Wolde-Michael | 210/512.1 |
| 4,378,289 | 3/1983 | Hunter | 210/512.1 |
| 4,414,112 | 11/1983 | Simpson et al. | 210/512.1 |
| 4,820,414 | 4/1989 | Carroll et al. | 210/512.1 |

FOREIGN PATENT DOCUMENTS 159274 10/1954 Australia ........................... 210/512.1

Primary Examiner—Robert A. Dawson
Assistant Examiner—Joseph Drodge
Attorney, Agent, or Firm—John E. Holder

[57] ABSTRACT

A cyclone separator with an inlet and two outlets for separating oil and water from an oil-water mixture wherein the separation chamber has a large diameter inlet end and a smaller diameter underflow outlet end, and is generally comprised of first, second and third chamber portions axially arranged in that order from the larger diameter end to the smaller diameter end, a first inlet portion is followed by a tapered, second portion and then a substantially cylindrical third portion. The overflow is arranged as an axial outlet at the inlet end of the chamber. The underflow outlet end is provided with a cone shaped end portion of increasing diameter in the direction of flow and a choke portion downstream of the cone shaped portion, the choke having a reducing diameter configuration.

18 Claims, 1 Drawing Sheet

CYCLONE SEPARATOR WITH ENLARGED UNDERFLOW SECTION

This application is a continuing application of applicant's co-pending application, Ser. No. 07/283,959, filed Nov. 21, 1988 now U.S. Pat. No. 4,980,064, entitled Cyclone Separator With Enlarged Underflow Section.

BACKGROUND OF THE INVENTION

This invention relates to cyclone separators.

The invention has particular, but not exclusive, application in liquid-separators, particularly separators for separating oil and water from an oil-water mixture such as of the kind described in International Application PCT/AU83/00028, U.S. Pat. No. 4,464,264, U.S. Pat. No. 4,576,724 or U.S. Pat. No. 4,237,006.

SUMMARY OF THE INVENTION

According to the invention there is provided a cyclone separator having an elongate separating chamber extending from a larger diameter end to a smaller diameter end, and having an overflow outlet at the larger diameter end, an underflow outlet at the smaller diameter end and inlet means, for inlet of fluid to be separated to the separating chamber, at a lengthwise location at least adjacent the larger diameter end; wherein the underflow outlet leads to an axially extending end portion of the separator, through which, in use of the separator, outflow from the underflow outlet passes, said end portion extending from a smaller diameter end to a larger diameter end, the smaller diameter end of the end portion being closest to the larger diameter end of the separating chamber. Preferably, said end portion is of frustoconical form with conicity (half-angle) in the range 6° to 20°, preferably 8°. A restrictive choke may be provided downstream of the end portion and is in a generally frustoconical form decreasing in diameter away from the end portion.

BRIEF DESCRIPTION OF THE FIGURE

The invention is further described by way of example only with reference to the accompanying drawing, the single FIGURE of which is a cross sectional diagram of a cyclone separator constructed in accordance with the invention.

DESCRIPTION OF THE PREFERRED EMBODIMENTS

Figure 1:
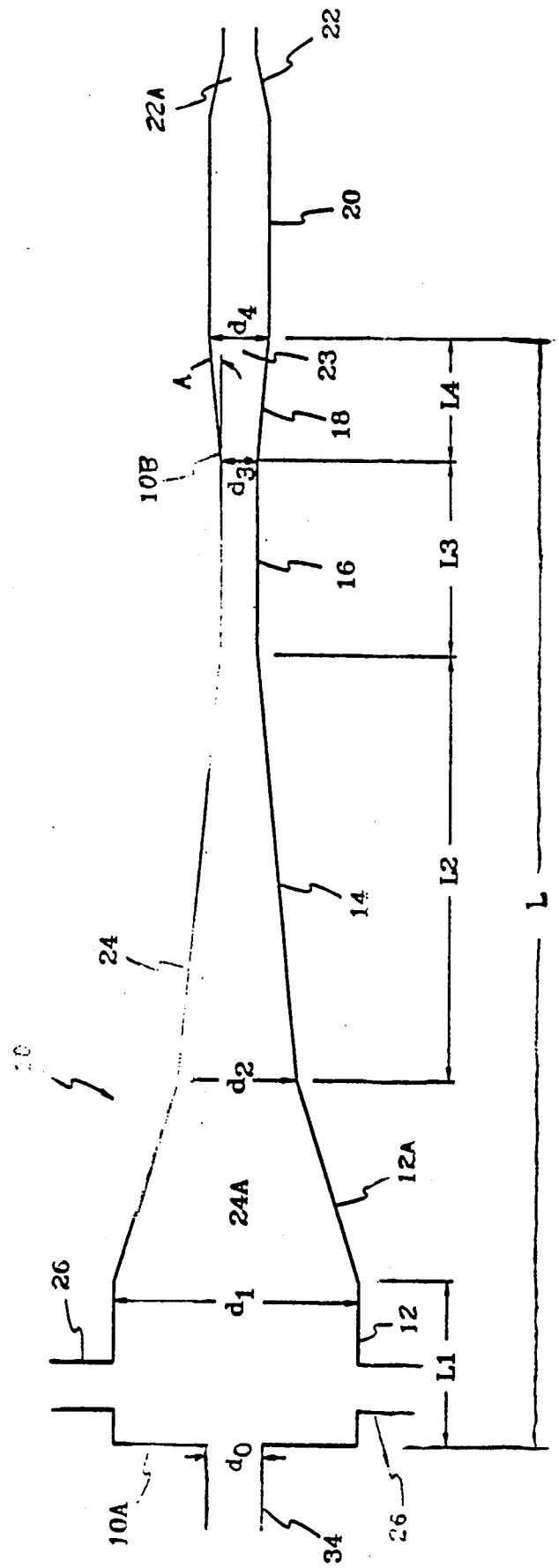

The exemplary cyclone separator shown comprises an outer casing 24 which defines an elongate separating chamber 24a therewithin. The separating chamber is axially symmetrical and of circular transverse cross section. Chamber 24a extends from a larger diameter end 10a of the separator to a smaller diameter end 10b of the separator. In this instance, the separating chamber defines a first portion 12 of cylindrical form, a second tapered portion 14, which tapered portion 14 in turn leads to a third portion 16 of cylindrical form. A tapered portion 12a extends between portions 12, 14. Portion 16 presents, at its end remote from portion 12, an underflow outlet 23. The portion 16 thence leads to an end portion 18 of the separator. The separating chamber 24a has an underflow outlet 23, for the denser fluid, this being located at the end of portion 16 remote from the larger diameter end 10a of the separator. The separating chamber 24a also has one or more tangential fluid inlets 26 positioned adjacent the larger diameter end of the separator and an axial overflow outlet 34 arranged at the larger diameter end (for outflow of the less dense of the components of the fluid to be separated).

The separator 10 is designed specifically, in this particular instance, for separation of oil from an oil-water mixture, the mixture being admitted via inlets 26, the separated water being taken off via outlet 23 and the separated oil being taken off via outlet 34. Separators of this or other type suitable for separating fluid components one from the other are generally designed to ensure relatively low shear stress within the liquid as it is moving within the separating chamber 24a. International Application PCT/AU83/00028, U.S. Pat. No. 4,464,264, Australian patent specification 84713/82 and U.S. Pat. No. 4,237,006 describe cyclone separators effective for separating oil from an oily water mixture where water predominates. These disclose particular configurations and dimensional constraints applicable to this type of separator. Generally, these separators are characterized by having relatively long length to diameter ratio, for example the diameter $d_1$ at the larger diameter end of the separator may be related to the overall length of the separator so that the overall length "L" is at least five times the diameter $d_1$. More particularly, the separator may be characterized by the following:

$10 \leq l_2/d_2 \leq 25$ $0.04 \leq 4A_i/\pi d_1^2 \leq 0.10$ $d_0/d_2 < 0.25$ $d_1 > d_2$ $d_2 > d_3$, where $d_1$, $d_2$, $d_3$ and $l_1$, $l_2$, $l_3$ are the diameters and lengths of the first portion 12, second portion 14 and third portion 16, respectively, $A_i$ is the total cross sectional area of the or of all of the inlets 26 measured at the points of entry normal to the inlet flow, and $d_0$ is the diameter of the outlet 34.

Where provided, the tapered portion 12a may have a taper whose conicity (half-angle) is 10°. The portion 14 may have a taper whose conicity (half-angle) is 20' to 1°. Where a portion such as portion 14 is tapered, the respective diameter such as diameter $d_2$ thereof in the above formulae is to be taken as the diameter thereof at the largest diameter end. These ratios are described in U.S. Pat. Nos. 4,576,724 and 4,237,006. In a particular form, disclosed in U.S. Pat. No. 4,576,724, the following relationship applies:

$d_0/d_2 < 0.1$.

The portion 18 is of frustoconical form increasing, away from the outlet 23 from a diameter $d_3$ at the end closest the outlet 23 to a diameter $d_4$ at the end remote therefrom. The conicity (half-angle) "A" of the portion 18 may be 8° and portion 18 may be of length $l_4$ rather more than the smallest diameter $d_3$ thereof such as $1 < l_4/d_3 < 5$. In accordance with conventional practice, the outlet 23 may be coupled such as via a pipe 20 through a suitable flow restricting means, or choke 22, which may be constructed in accordance with the teachings of U.S. Pat. No. 4,464,264, or International Application PCT/AU83/00028 for outflow therefrom of the denser liquid (water in this instance) from the separator. Particularly, the flow restricting means may present a passageway 22a which is of generally frustoconical form decreasing in diameter away from the end portion 18 to a diameter at the end remote from the end portion 18 which is in the range ⅓ to ⅔ the diameter of the passageway 22a at the end adjacent end portion 18.

The provision of the portion 18 has been found to be particularly useful in that it permits a relative shortening of the length of the separator as compared with its diameter, as compared with what would be the case otherwise. As mentioned, separators for separating liquid components, particularly the aforementioned oily water mixtures, are generally characterized by being of relatively great length and the reduction in length achievable by use of the portion 18 is therefore of practical significance in enabling fitment of separators into confined spaces and, furthermore, in reducing manufacturing costs. The provision of the portion 18 is thought to facilitate operation by permitting recovery of dynamic pressure head loss which normally occurs in the operation of separators of the kind in question. In particular, there will normally be a substantial static pressure loss from the inlets 26 to the outlet 23 of the separator, and the frustoconical configuration of the portion 18 aids in minimizing this loss.

As described in International Application PCT/AU85/00010, the multiple tangential inlets 26 shown may be replaced by a single inlet of involute form.

We claim:

1. A cyclone separator designed, sized and arranged for treating an oil-water mixture for separating the more dense water component from the less dense oil component thereof, comprising:

an elongate separating chamber of circular cross section and extending from a larger diameter end to a smaller diameter end, and having an axial overflow outlet at the larger diameter end, an underflow outlet at the smaller diameter end, the separating chamber comprising first, second and third chamber portions axially arranged in that order, from the larger diameter end to the smaller diameter end, the first chamber portion comprising an inlet chamber having at least one inlet for introducing oily water tangentially into the separating chamber and having a diameter $d_1$, the second portion comprising a tapered portion extending in a direction from a larger diameter end to a smaller diameter end and having a diameter $d_2$ at its larger end and a diameter $d_3$ at its smaller end, and the third portion comprising a generally cylindrical portion of diameter $d_3$, the cyclone separator also including at the underflow outlet end of the separating chamber an end portion being adjacent to and extending from said third portion and flaring outwardly in the direction of $d_2$ towards $d_3$ from a smaller diameter end and progressively enlarging to a larger diameter end, the smaller diameter end of the end portion being the end portion end closest to the larger diameter end of the separating chamber, said end portion being of frustoconical form, with a conicity (half-angle) in a range of 6° to 20°.

2. The cyclone separator of claim 1 wherein the conicity (half-angle) of the end portion is substantially 8°.

3. The cyclone separator of claim 1 wherein the end portion has a length longer than the diameter of the smaller diameter end of the end portion.

4. The cyclone separator of claim 3 wherein:
$1 < l_4/d_3 < 5$,
where $l_4$ is the length of the end portion and $d_3$ is the diameter of the end portion at its smaller diameter end.

5. A cyclone separator of claim 1 wherein the conicity (half-angle) of the second portion is in the range 20' to 1°.

6. A cyclone separator of claim 1 including flow restriction means coupled to the larger diameter end of said end portion to restrict flow from the end portion.

7. A cyclone separator as claimed in claim 6 wherein said flow restricting means comprises a passageway which decreases in diameter away from said end portion to a diameter at an end of the passageway remote from said end portion which is in a range of ⅓ to ⅔ of a diameter of the passageway adjacent said end portion.

8. A cyclone separator designed, sized and arranged for treating an oil-water mixture for separating the more dense water component from the less dense oil component thereof comprising:

an elongated separating chamber of circular cross section and extending from a larger diameter end to a smaller diameter end, and having an overflow outlet at the larger diameter end, an underflow outlet at the smaller diameter end, the separating chamber comprising first, second and third chamber portions axially arranged in that order, from the larger diameter end to the smaller diameter end, the first chamber portion including an inlet chamber, inlet means for inlet of fluid to be separated in the separating chamber and having a point of entry into said inlet chamber for introducing oily water tangentially into said inlet chamber, said inlet chamber having a diameter $d_1$, the second portion comprising a tapered portion extending in a direction from a larger diameter end to a smaller diameter end and having a diameter $d_2$ at its larger end and a diameter $d_3$ at its smaller end, and the third portion comprising a generally cylindrical portion of diameter $d_3$, the cyclone separator also including at the underflow outlet end of the separating chamber an end portion being adjacent to and extending from said third portion and flaring outwardly in the direction of $d_2$ towards $d_3$ from a smaller diameter end and progressively enlarging to a larger diameter end, the smaller diameter end of the end portion being the end portion end closest to the larger diameter end of the separating chamber, wherein
$10 \leq l_2/d_2 \leq 25$
$0.04 \leq 4A_i/\pi d_1^2 \leq 0.10$
$d_0/d_2 < 0.25$
$d_1 > d_2$
$d_2 > d_3$
where $l_1$, $l_2$ and $l_3$ are the lengths of the first, second and third portions respectively, $d_1$ and $d_3$ are the diameters of the first and third portions respectively, $d_2$ is the diameter of the second portion larger diameter end, $d_0$ is the diameter of the overflow outlet and $A_i$ is the total cross sectional area for inflow of material to the separating chamber as presented by the inlet means and measured at said point of entry normal to inlet flow.

9. The cyclone separator of claim 8 wherein $d_0/d_2 < 0.1$.

10. A cyclone separator having elements designed, sized, and arranged for treating an oil-water mixture for separating the more dense water component from the less dense oil component thereof, comprising:

an elongate separating chamber of circular cross section and extending from a larger diameter end to a smaller diameter end including a tapered portion, and having an overflow outlet at the larger diameter end for outflowing the less dense oil component of the mixture, an underflow outlet for outflowing the more dense water component of the mixture and inlet means for inlet of the fluid mixture to be separated, such separating chamber having a relatively long length to diameter ratio and being arranged to provide a low shear stress to liquids moving within the separating chamber, and further wherein said separating chamber comprises first, second and third chamber portions axially arranged in that order from the larger diameter end to the smaller diameter end, the first chamber portion including said inlet means comprising at least one inlet open to the first portion, the overflow outlet and underflow outlet being arranged to axially outlet from the first portion and the third portion respectively, and wherein the second portion is the tapered portion and which extends from a larger diameter end to a smaller diameter end, where $l_1$, $l_2$ and $l_3$ are the lengths of the first, second, and third portions respectively, where $d_1$ is the diameter of the first portion $l_1$ and $d_2$ is the diameter at the larger end of the second portion $l_2$, and where $d_1$ is greater than $d_2$ to form a tapering transition portion between the first portion and the second portion, and end portion means arranged to extend from said third portion of said separation chamber at the smaller diameter end thereof for minimizing pressure head loss occurring in the separation process from the inlet to the underflow outlet of the separation chamber, said end portion means being frustoconically shaped and expanding in diameter as it extends away from said third portion of said separation chamber.

11. A cyclone separator as set forth in claim 10 wherein the conicity (half-angle) of the second portion is in a range of 20' to 1°.

12. A cyclone separator for separating oil from oily water comprising an elongate separating chamber of circular cross section and extending from a larger diameter end to a smaller diameter end and having an axial overflow outlet at the larger diameter end and an underflow outlet at the smaller diameter end, the separating chamber comprising first, second and third chamber portions axially arranged in that order from the larger diameter end to the smaller diameter end, the first chamber portion comprising an inlet chamber having at least one inlet for introducing oily water tangentially into the separating chamber and having a largest diameter $d_1$, the second portion comprising a tapered portion extending in a direction from a larger diameter end to a smaller diameter end and having a diameter $d_2$ at its larger end and a diameter $d_3$ at its smaller end, and the third portion comprising a generally cylindrical portion of diameter $d_3$, the cyclone separator also including at the underflow outlet end of the separating chamber an end portion being adjacent to and extending from said third portion and flaring outwardly in the direction of $d_2$ towards $d_3$ at a half angle of taper within a range of from 6° to 20° from a diameter $d_3$ to a diameter $d_4$ and wherein $d_1 > d_2$; $d_2 > d_3$; and $d_4 > d_3$.

13. The cyclone separator of claim 12, wherein the second portion has a half-angle of taper in a range 20' to 1°.

14. The cyclone separator of claim 12 wherein $1 > l_4/d_3 < 5$ where $l_4$ is the length of the end portion and $d_3$ is the diameter of the end portion at its smaller diameter end.

15. A cyclone separator for separating oil from oily water comprising an elongate separating chamber of circular cross section and extending from a larger diameter end to a smaller diameter end and having an axial overflow outlet at the larger diameter end and an underflow outlet at the smaller diameter end, the separating chamber comprising first, second and third chamber portions axially arranged in that order from the larger diameter end to the smaller diameter end, the first chamber portion comprising an inlet chamber having at least one inlet for introducing oily water tangentially into the separating chamber and having a larger diameter $d_1$, the second portion comprising a tapered portion having a half angle of taper within the range of 20' to 1° and extending in a direction from a diameter $d_2$ larger end to a diameter $d_3$ smaller end, and the third portion comprising a generally cylindrical portion of diameter $d_3$, the cyclone separator also including at the underflow outlet end of the separating chamber an end portion having a length and which flares outwardly in the direction of $d_2$ towards $d_3$ at a half angle of taper within a range of from 6° to 20° from a diameter $d_3$ to a diameter $d_4$, and wherein $d_1 > d_2$; $d_2 > d_3$; and $d_4 > d_3$.

16. A cyclone separator as claimed in claim 15 wherein:

$1 < l_4/d_3 < 5$, where $l_4$ is the length of the end portion and $d_3$ is the diameter of the end portion at its smaller diameter end.

17. A cyclone separator as claimed in claim 16 where $d_0/d_2 < 0.1$.

18. A cyclone separator as claimed in claim 15 wherein:

$10 \leq l_2/d_2 \leq 25$
$0.4 \leq 4A_i/\pi d_1^2 \leq 0.10$
$d_0/d_2 < 0.25$
$d_1 > d_2$
$d_2 > d_3$ where $l_1$, $l_2$ and $l_3$ are the lengths of the first, second and third portions respectively, $d_0$ is the diameter of the overflow outlet and $A_i$ is a measurement of total cross sectional area of inflow of material to the separating chamber through the inlet means as measured at points of entry to the inlet and normal to inflow through said points.

* * * * *

UNITED STATES PATENT AND TRADEMARK OFFICE
CERTIFICATE OF CORRECTION

PATENT NO. : 5,100,552
DATED : March 31, 1992
INVENTOR(S) : Noel Carroll

It is certified that error appears in the above-identified patent and that said Letters Patent is hereby corrected as shown below:

Column 6:
Claim 14, line 2, formula "$1>1_4/d_3<5$" should read --$1<1_4/d_3<5$--.

Signed and Sealed this

Twenty-first Day of September, 1993

Attest:

BRUCE LEHMAN

*Attesting Officer*  *Commissioner of Patents and Trademarks*